(12) United States Patent
Kolze

(10) Patent No.: US 8,731,113 B2
(45) Date of Patent: *May 20, 2014

(54) CHARACTERIZING CHANNEL RESPONSE USING DATA TONE DECISION FEEDBACK

(75) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,166

(22) Filed: Jul. 12, 2012

(65) Prior Publication Data

US 2012/0281789 A1    Nov. 8, 2012

Related U.S. Application Data

(63) Continuation of application No. 12/340,596, filed on Dec. 19, 2008, now Pat. No. 8,229,036.

(60) Provisional application No. 61/008,564, filed on Dec. 21, 2007, provisional application No. 61/008,566, filed on Dec. 21, 2007.

(51) Int. Cl.
    *H04L 27/06* (2006.01)

(52) U.S. Cl.
    USPC ........... 375/340; 375/260; 375/347; 375/349; 375/350; 375/351; 370/208; 370/210

(58) Field of Classification Search
    CPC ............ H04L 27/2647; H04L 25/0236
    USPC ................ 375/260, 340, 347, 349, 350, 351; 370/208, 210
    See application file for complete search history.

(56) References Cited

U.S. PATENT DOCUMENTS

| | | | |
|---|---|---|---|
| 6,459,728 B1 * | 10/2002 | Bar-David et al. | 375/231 |
| 6,901,125 B2 * | 5/2005 | Ghazi-Moghadam et al. | 375/347 |
| 7,499,497 B2 * | 3/2009 | Huang et al. | 375/260 |
| 7,526,020 B2 * | 4/2009 | Kao et al. | 375/229 |
| 7,656,969 B2 * | 2/2010 | Strong | 375/316 |
| 8,098,747 B2 * | 1/2012 | Lee | 375/260 |
| 8,229,036 B2 * | 7/2012 | Kolze | 375/340 |
| 8,275,055 B2 * | 9/2012 | Zhang et al. | 375/260 |
| 2006/0198453 A1 * | 9/2006 | Huang et al. | 375/260 |
| 2008/0049852 A1 * | 2/2008 | Lee | 375/260 |

* cited by examiner

*Primary Examiner* — Sophia Vlahos

(74) *Attorney, Agent, or Firm* — Garlick & Markison; Shayne X. Short

(57) ABSTRACT

In addition, to pilot tones which may be existent within an orthogonal frequency division multiplexing (OFDM) signal, one or more data tones within that same signal may be employed to assist with channel estimation (alternatively, detection). Once a data tone qualifies as a pseudo-pilot tone, it may be used with the pilot tones for channel estimation. A qualifier considers slicer error associated with hard decisions for a data tone to determine if it is a candidate for assistance within channel estimation. A frame within an OFDM signal may, in one situation, include no pilot tones at all, and a previously calculated channel estimate may be used to process that frame. In addition, fewer pilot tones than needed to perform accurate channel estimation (based on the channel delay spread) may be employed by using one or more pseudo-pilot tones (e.g., qualified data tones).

20 Claims, 15 Drawing Sheets

CHARACTERIZING CHANNEL RESPONSE USING DATA TONE DECISION FEEDBACK

CROSS REFERENCE TO RELATED PATENTS/PATENT APPLICATIONS

Continuation priority claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 12/340,596, entitled "Characterizing channel response using data tone decision feedback," filed Dec. 19, 2008, pending, and scheduled subsequently to be issued as U.S. Pat. No. 8,229,036 on Jul. 24, 2012 (as indicated in an ISSUE NOTIFICATION mailed on Jul. 4, 2012), which claims priority pursuant to 35 U.S.C. §119(e) to the following U.S. Provisional Patent Applications which are hereby incorporated herein by reference in their entirety and made part of the present U.S. Utility Patent Application for all purposes:

1.1. U.S. Provisional Application Ser. No. 61/008,564, entitled "Apparatus and method for characterizing channel response using data tone decision feedback," filed Dec. 21, 2007, now expired.

1.2. U.S. Provisional Application Ser. No. 61/008,566, entitled "Apparatus and method for characterizing channel response based on composite gain determination," filed Dec. 21, 2007, now expired.

Incorporation by Reference

The following U.S. Utility Patent Applications are hereby incorporated herein by reference in their entirety and made part of the present U.S. Utility Patent Application for all purposes:

1. U.S. Utility patent application Ser. No. 12/340,603, entitled "Characterizing channel response based on composite gain determination," filed Dec. 19, 2008, pending.

2. U.S. Utility patent application Ser. No. 10/112,567, entitled "Characterizing channel response in a single upstream burst using redundant information from training tones," filed Mar. 30, 2002, now U.S. Pat. No. 7,139,331 B2, issued on Nov. 21, 2006.

BACKGROUND OF THE INVENTION

1. Technical Field of the Invention

The invention relates generally to communication systems; and, more particularly, it relates to performing channel estimation within such communication systems.

2. Description of Related Art

Data communication systems have been under continual development for many years. Generally speaking, within the context of communication systems that employ various types of communication devices, there is a first communication device at one end of a communication channel with encoder capability and second communication device at the other end of the communication channel with decoder capability. In many instances, one or both of these two communication devices includes encoder and decoder capability (e.g., within a bi-directional communication system). Transferring information from one location to another can be applied generally within any type of communication system, including those that employ some form of data storage (e.g., hard disk drive (HDD) applications and other memory storage devices) in which data is processed and/or encoded before writing to the storage media, and then the data is processed and/or decoded after being read/retrieved from the storage media.

Certain communication systems employ one or more of various types of coding (e.g., error correction codes (ECCs) whose decoding may be performed iteratively) to ensure that the data extracted from a signal received at one location of a communication channel is the same information that was originally transmitted from another location of the communication channel. Communications systems with iterative codes are often able to achieve lower bit error rates (BER) than alternative codes for a given signal to noise ratio (SNR).

In addition, various types of communication systems may employ one or more of various types of signaling (e.g., orthogonal frequency division multiplexing (OFDM), code division multiple access (CDMA), synchronous code division multiple access (S-CDMA), time division multiple access (TDMA), etc.) to allow more than one user access to the communication system. Such signaling schemes may generally be referred to as multiple access signaling schemes.

In accordance with processing signals transmitted across a communication channel within such communication systems, one function that is oftentimes performed is that of channel estimation. From certain perspectives, channel estimation (sometimes alternatively referred to as channel detection, channel response characterization, channel frequency response characterization, etc.) is a means by which at least some characteristics of the communication channel (e.g., attenuation, filtering properties, noise injection, etc.) can be modeled and compensated for by a receiving communication device. While the prior art does provide some means by which channel estimation may be performed, there is an ever-present need for better and more efficient channel estimation approaches that intrude as minimally as possible in the maximum and overall throughput that be achieved for signals transmitted across a communication channel within a communication system.

DETAILED DESCRIPTION OF THE INVENTION

Figure 1:
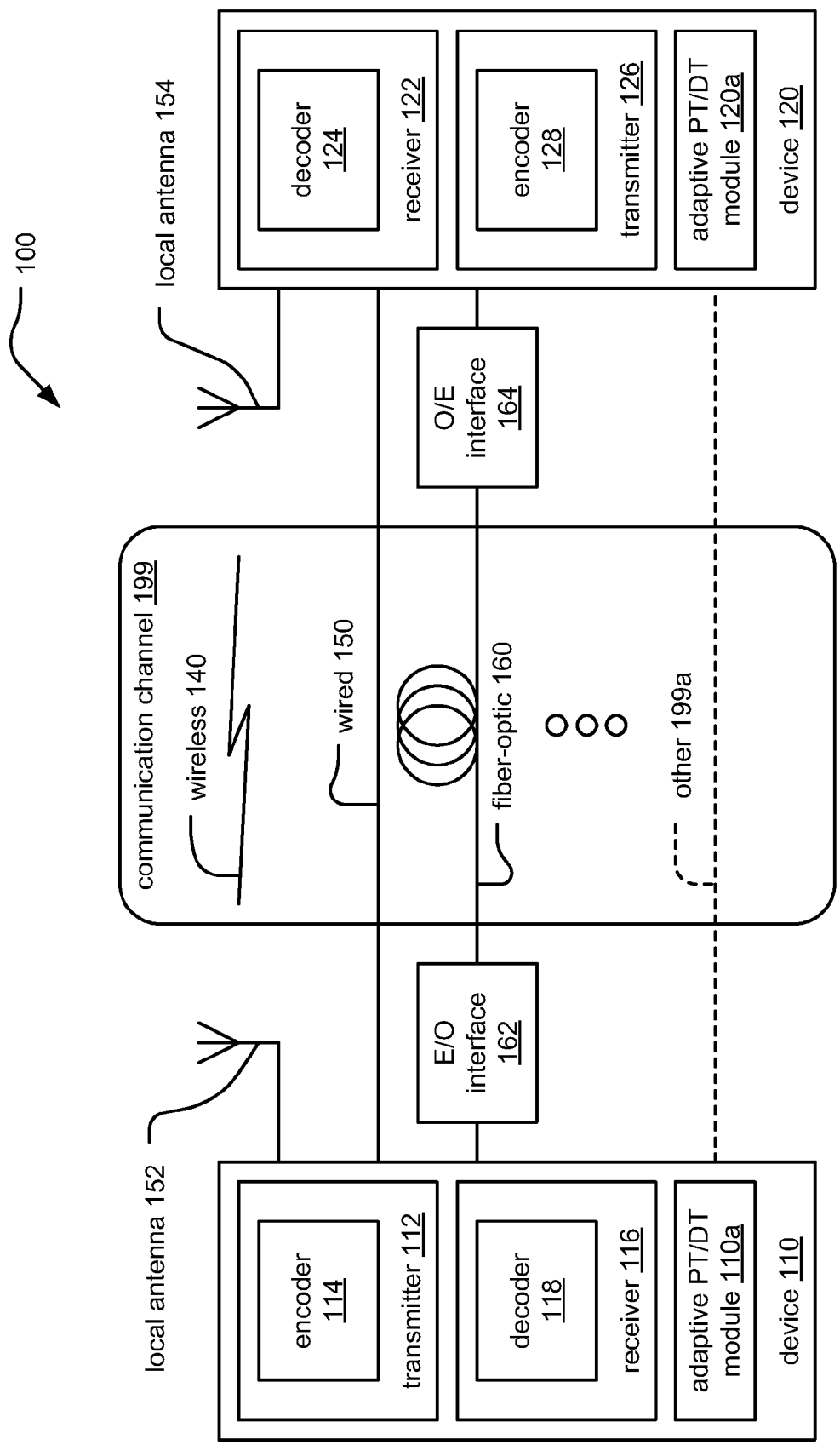
FIG. 1 and FIG. 2 illustrate various embodiments of communication systems.

In orthogonal frequency division multiplexing (OFDM), the channel estimation (e.g., alternatively referred to as channel frequency response characterization, channel frequency response estimation, channel detection, etc.) of a communication channel is generally estimated so that its results may be applied to each data tone (DT) within the OFDM signal (that may also include pilot tones (PTs therein)), in order to adjust the gain and phase of the received data tone for slicing (e.g., assuming some order of quadrature amplitude modulation (QAM) modulation on the tones, such as quadrature phase key shifting (QPSK)/4 QAM, 16 QAM, 64 QAM, 256 QAM, 1024 QAM, or other QAM orders (e.g., even higher) or even different modulation types having shapes different than QAM, such as 8 PSK, which may have even a higher order of modulation).

If pulse amplitude modulation (PAM) is employed as the modulation scheme, then only gain adjustment (as determined from channel estimation) is needed. The channel frequency response, if static, requires sampling in the frequency domain (by sampling the pilot tones (PTs) [alternatively referred to as training tones (TTs)] within the signal), to estimate the frequency response (or equivalently, the time domain impulse response), across the entire communication channel.

The spacing of the PTs (in the frequency domain) needs to be sufficiently close to satisfy the sampling theorem (e.g., Nyquist theorem), depending on the length of the pertinent amount of energy in the impulse response. However, the closer that the PTs are spaced, then the less efficient is the use of the time-frequency dimensions available for signaling (data transmission); this directly can reduce the overall throughput of a signal transmitted across the communication channel.

Using more PTs than required, by sampling theory, also inherently reduces the efficiency of the transmission, but it may improve the channel estimation (by providing more samples, allowing reduction of noise variance). If the channel frequency response is time-varying (dynamic), then averaging the channel estimation over time may also become problematic. Therefore, the dynamics of the changing channel response (which consequently makes for changing/varying channel estimates/estimations) must be balanced against the noise smoothing in determining the way in which multiple OFDM frames (or other multiple OFDM signal portions) are weighted if more than one frame is used for channel estimation.

Various forms of interferences may deleteriously affect the pilot tones and introduce a gain change that is rapidly varying compared to other changes in the channel in cable system applications, but such interference may also be common to all tones across the channel. One such form of deleterious interference may be that of amplitude modulation of a signal, and one such type of amplitude modulation may be hum modulation (e.g., such as that incurred by various electronic devices within a communication system that perform some type of signal rectification of an alternating current (AC) signal thereby generating a direct current (DC) signal). This hum modulation oftentimes has certain frequency components that are integer multiples of the power system frequency (e.g., hum modulation at 120 Hertz (Hz) in North America, and oftentimes 100 Hz in other regions of the world, based on power system frequencies of 60 Hz and 50 Hz, respectively).

By isolating this common component of the gain on each data tone, from the rest of the channel estimate, a much longer smoothing time (e.g., more frames or more of a signal) can be applied to estimating the remainder of the channel response. Referring back to hum modulation, since the hum component is common to all the tones (e.g., all PTs and DTs), every PT can be used to smooth the deleterious effects of hum modulation. Also, since the hum frequency is typically known (e.g., 120 Hz or 100 Hz), this 'a priori' knowledge can be used to improve further the channel estimation and compensation of this component.

In one embodiment, errors which may exist within a channel estimate may be eliminated and/or reduced using various approaches presented herein, and their equivalents. By providing a means to improve slicer performance, reduction of any channel estimation error may be achieved. In one embodiment, this allows for a much better performance within relatively slowly changing communication channel (relatively predictable and stable communication channels such as within wire-based systems). However, for applications within communication systems whose communication channels may be rapidly changing (e.g., wireless, satellite, etc.), the channel estimation may nonetheless still be significantly improved using various approaches presented herein, and their equivalents. This improvement in channel estimation may be achieved without increasing the inefficiency of PTs and may be viewed as a universal advantage for a wide variety of communication systems.

Various approaches presented herein improve on the performance of the channel estimation in any receiving communication device (e.g., a downstream receiver). Significant degradation in throughput, performances, etc. can be avoided by implementing at least one of the embodiments, or its equivalent, as presented herein. It is also possible to use more frames (or more signal portions) to estimate the channel frequency response, since the rapid gain changes due to certain types of amplitude modulation (e.g., hum modulation) may be tracked and compensated for using a separate gain term and/or filter tap.

Considering one type of communication system, namely, a cable system, when utilizing OFDM modulation, some characteristics that govern and drive performance of such a communication system are channel estimation (e.g., employed for setting slicer gain for each data tone) and phase noise. In cable systems, a desired goal for data tone to pilot tone ratio/spacing oftentimes approaches the efficiency of 31/32 (e.g., 31 data tones for each 1 pilot tone in a 32 tone signal portion). These tones may be spaced apart by some predetermined frequency range (e.g., 333 kilo-Hz (kHz)) to ensure adequate sampling of the spectrum. In one embodiment, this is in turn derived from the 1.5 micro-second impulse response duration. It follows from the Nyquist sampling theory, combined with the channel model for the impulse response, that the sampling of the frequency domain must be at least 333 kHz. The close tone spacing of 10.4 kHz (based on 333 kHz/32 tones) puts severe pressure on the phase noise performance, which may introduce significant degradation into the communication channel/link.

Channel estimation is required to set the phase and gain for slicing the data tones. Accuracy is very critical, of course, for high order and higher density modulation signals (e.g., 64 QAM, 256 QAM, 1024 QAM, or even higher modulation order).

One embodiment, which operates on an OFDM signal, employs a decision-feedback based approach, and it relies on past/previous pilot tones plus the hard decisions made on at least one of the data tones (or any number of data tones including up to all of the data tones). Since the channel estimate is generally highly correlated for closely spaced data tones, the decision feedback approach can benefit from and capitalize upon this correlation to identify likely symbol decision errors. These may then be eliminated from contributing to the channel estimation (thereby reducing any error in the channel estimate). In other words, once the slicer determination is made, then an output constellation data point will result for each OFDM channel. This constellation data point can be compared with the input constellation data point (assuming gross phase alignment) to determine an error vector between the output constellation data point and the input constellation data point. The error vector can be used to define any error in the channel estimate (e.g., to characterize the channel), if the output constellation data point is assumed (at least temporarily) to be correct. For example, if the input constellation data point is 2% below in amplitude from slicer output constellation data point, then the 2% attenuation can be attributed to the channel characteristic.

As can be seen, the actual slicer output data points (e.g., from data tones) are employed in addition to hard decisions from pilot tones for performing channel estimation. From another perspective, it may be seen that data tone hard decisions (and/or their associated error terms as generated by a slicer) are employed in cooperation with pilot hard decisions (and/or their associated error terms as generated by the slicer) to effectuate an improved channel estimate.

In some embodiments, this is particularly beneficial because there may be significantly more data tones than pilot tones within an OFDM signal. As such, a more robust channel estimate can be achieved. By using various aspects presented herein to perform channel response characterization, fewer pilot tones may be employed within an OFDM signal that is currently known in the art. Also, in some embodiments, portions of the OFDM signal need not include any pilot tones whatsoever.

One goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media (or combinations thereof) as well.

Figure 2:
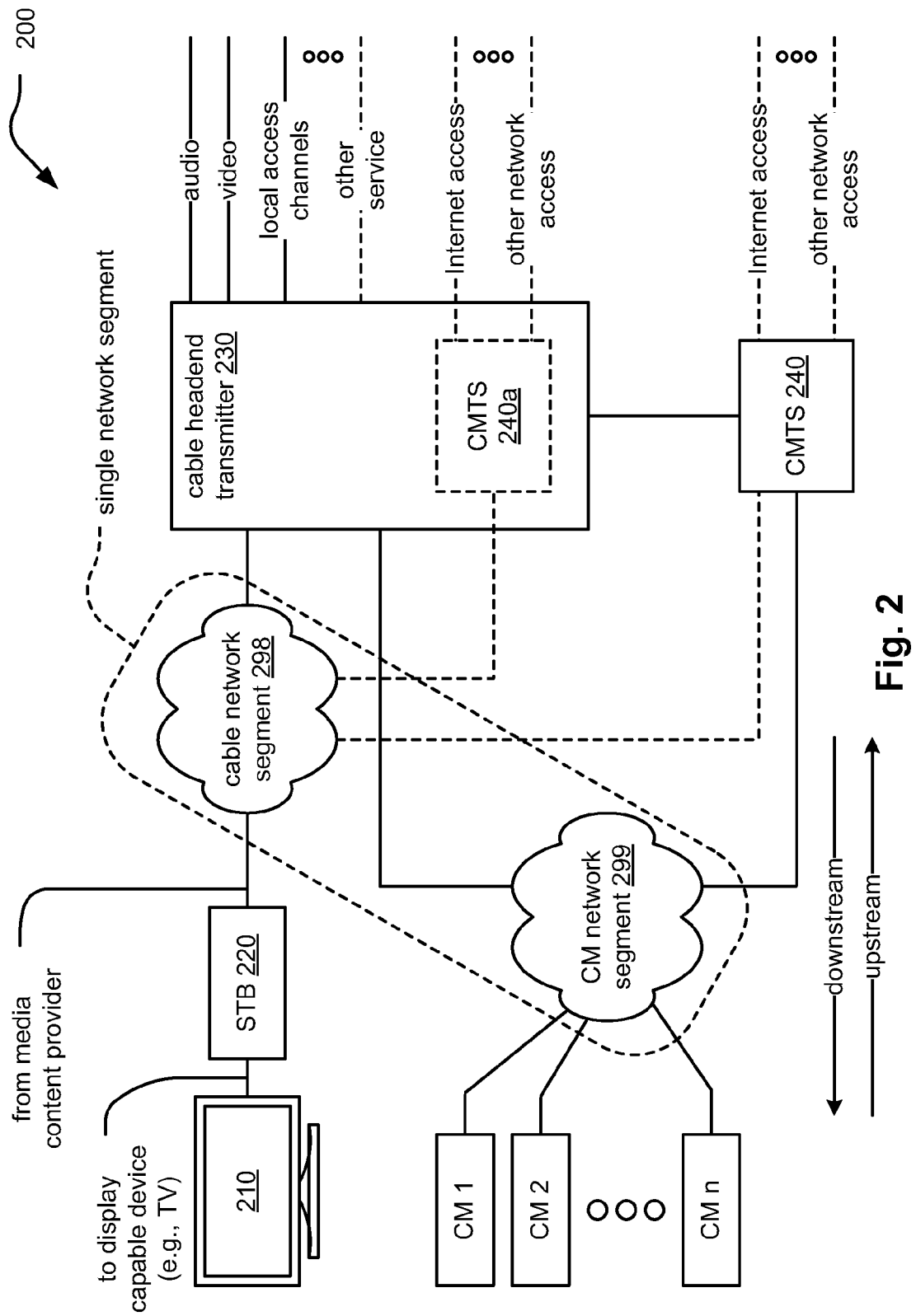

FIG. 1 and FIG. 2 are diagrams which illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver.

There are several different types of media by which the communication channel 199 may be implemented (e.g., a wireless communication channel 140 using local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter and a decoder at the receiver.

The communication device 110 includes an adaptive pilot tone/data tone (PT/DT) module 110a that is capable to perform functionality of at least one of the embodiments described herein. Also, the communication device 120 includes an adaptive PT/DT module 120a that is also capable to perform functionality of at least one of the embodiments described herein. Each of the modules 110a and 120a may operate independently within its respective communication device, or they may operate in cooperation with one another.

It is noted that while this embodiment of communication system 100 includes communication devices 110 and 120 that include both transmitter and receiver functionality, clearly, communication device 110 could include only transmitter functionality and communication device 120 could include only receiver functionality, or vice versa, to support uni-directional communication (vs. bi-directional communication) in alternative embodiments.

Any of a variety of types of coded signals (e.g., turbo coded signals, turbo trellis coded modulation (TTCM) coded signal, LDPC (Low Density Parity Check) coded signals, Reed-Solomon (RS) coded signal, and/or any combination of such coded signals, etc.) can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Referring to the communication system 200 of FIG. 2, this communication system 200 may be viewed particularly as being a cable system. For example, the communication system 200 includes a number of cable modems (shown as CM 1, CM 2, and up to CM n). A cable modem network segment 299 couples the cable modems to a cable modem termination system (CMTS) (shown as 240 or 240a and as described below).

A CMTS 240 or 240a is a component that exchanges digital signals with cable modems on the cable modem network segment 299. Each of the cable modems coupled to the cable modem network segment 299, and a number of elements may be included within the cable modem network segment 299. For example, routers, splitters, couplers, relays, and amplifiers may be contained within the cable modem network segment 299.

The cable modem network segment 299 allows communicative coupling between a cable modem (e.g., a user) and the cable headend transmitter 230 and/or CMTS 240 or 240a. Again, in some embodiments, a CMTS 240a is in fact contained within a cable headend transmitter 230. In other embodiments, the CMTS is located externally with respect to the cable headend transmitter 230 (e.g., as shown by CMTS 240). For example, the CMTS 240 may be located externally to the cable headend transmitter 230. In alternative embodiments, a CMTS 240a may be located within the cable headend transmitter 230. The CMTS 240 or 240a may be located at a local office of a cable television company or at another location within a cable system. In the following description, a CMTS 240 is used for illustration; yet, the same functionality and capability as described for the CMTS 240 may equally apply to embodiments that alternatively employ the CMTS 240a. The cable headend transmitter 230 is able to provide a number of services including those of audio, video, local access channels, as well as any other service of cable systems. Each of these services may be provided to the one or more cable modems (e.g., CM 1, CM2, etc.). In addition, it is noted that the cable headend transmitter 230 may provide any of these various cable services via cable network segment 298 to a set top box (STB) 220, which itself may be coupled to a television 210 (or other video or audio output device). While the STB 220 receives information/services from the cable headend transmitter 230, the STB 220 functionality may also support bi-directional communication, in that, the STB 220 may independently (or in response to a user's request) communicate back to the cable headend transmitter 230 and/or further upstream.

In addition, through the CMTS 240, the cable modems are able to transmit and receive data from the Internet and/or any other network (e.g., a wide area network (WAN), internal network, etc.) to which the CMTS 240 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 240 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 299, decides whether a particular block of data is intended for it or not. On the upstream side, information is sent from the cable modems to the CMTS 240; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Some embodiments implementing the invention are described below and in the various Figures that show the data handling and control within one or both of a cable modem and a CMTS within a cable system, or any other type of communication device implemented within any type of communication system (e.g., see FIG. 1), that operates by employing orthogonal frequency division multiplexing (OFDM). The cable modems, the STB 220, the cable headend transmitter 230, and/or the CMTS 240 (or 240a) may perform channel estimation in accordance with any of the various aspects described herein, including by employing an adaptive PT/DT module therein. As with the previous embodiment of FIG. 1, adaptive PT/DT modules implemented within different components within FIG. 2 may also operate in cooperation with one another.

Moreover, it is noted that the cable network segment 298 and the cable modem network segment 299 may actually be the very same network segment in certain embodiments. In other words, the cable network segment 298 and the cable modem network segment 299 need not be two separate network segments, but they may simply be one single network segment that provides connectivity to both STBs and/or cable modems. In addition, the CMTS 240 or 240a may also be coupled to the cable network segment 298, as the STB 220 may itself include cable modem functionality therein.

Figure 3:
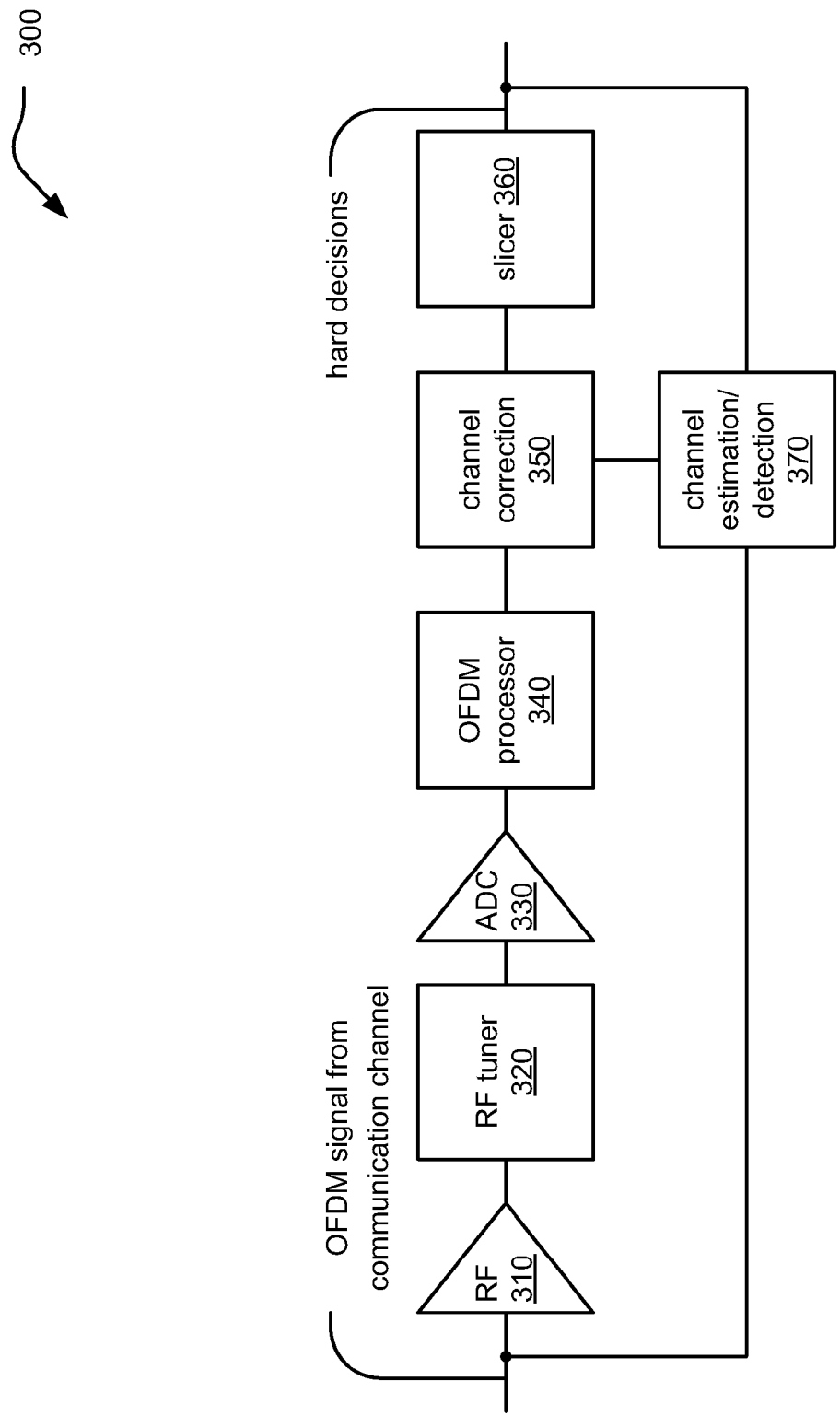
FIG. 3 illustrates an embodiment of an apparatus that processes an orthogonal frequency division multiplexing (OFDM) signal to perform channel estimation.

FIG. 3 illustrates an embodiment of an apparatus 300 that processes an orthogonal frequency division multiplexing (OFDM) signal to perform channel estimation. An OFDM signal is received from a communication channel and is processed initially by a radio frequency (RF) module 310, which may perform gain adjustment thereto. The signal output from the RF module 310 is provided to an RF tuner 320 to select the appropriate signal portion (e.g., in terms of tuned frequency) intended for the apparatus 300. Thereafter, digital sampling (e.g., such as by an analog to digital converter (ADC) 330) generates a discrete time signal (e.g., a digital signal) from the signal output from the RF tuner 320. An OFDM processor 340 performs appropriate processing of its received signal to extract the appropriate signal portion intended for the apparatus 300. A channel correction module 350 employs a channel estimate (e.g., such as a predetermined channel estimate, a channel estimate provided by channel estimation/detection module 370, etc.) to try to compensate for any deleterious channel induced effects.

In this embodiment, output hard decisions from a slicer module 360, which is coupled to the channel correction module 350, are fed back to the channel estimation/detection module 370. The output of the slicer module 360, for each data tone, is fed back to the channel estimation/detection module 370 for comparison with the input OFDM signal to determine the channel estimate (e.g., the channel impulse response). As discussed above, if the error vector is determined to be too large, above a certain threshold, then the error term can be weighted or thrown out completely.

It is noted that the channel estimate (e.g., of channel frequency response) is improved by using the symbol decisions to "back out" the slicer error, if any, and the channel estimate can be computed for each pilot tone with much more data samples, thus reducing any variance that may be attributed to thermal noise. Of course, symbol errors are considered, since they may operate to increase the error in the channel estimate when they do in fact occur in such a decision feedback scheme.

By comparing the raw "channel estimate/frequency response estimate+noise" in adjacent data tones (and nearly adjacent, and so on), and by realizing that the channel estimate generally does not vary greatly for adjacent data tones, symbol errors may be identified immediately, and these potentially erroneous symbols may be excluded (at a minimum) from the channel estimation (frequency response estimation process) thereby improving channel estimates for use compensating for channel effects incurred within a signal transmitted across a communication channel.

Figure 4:
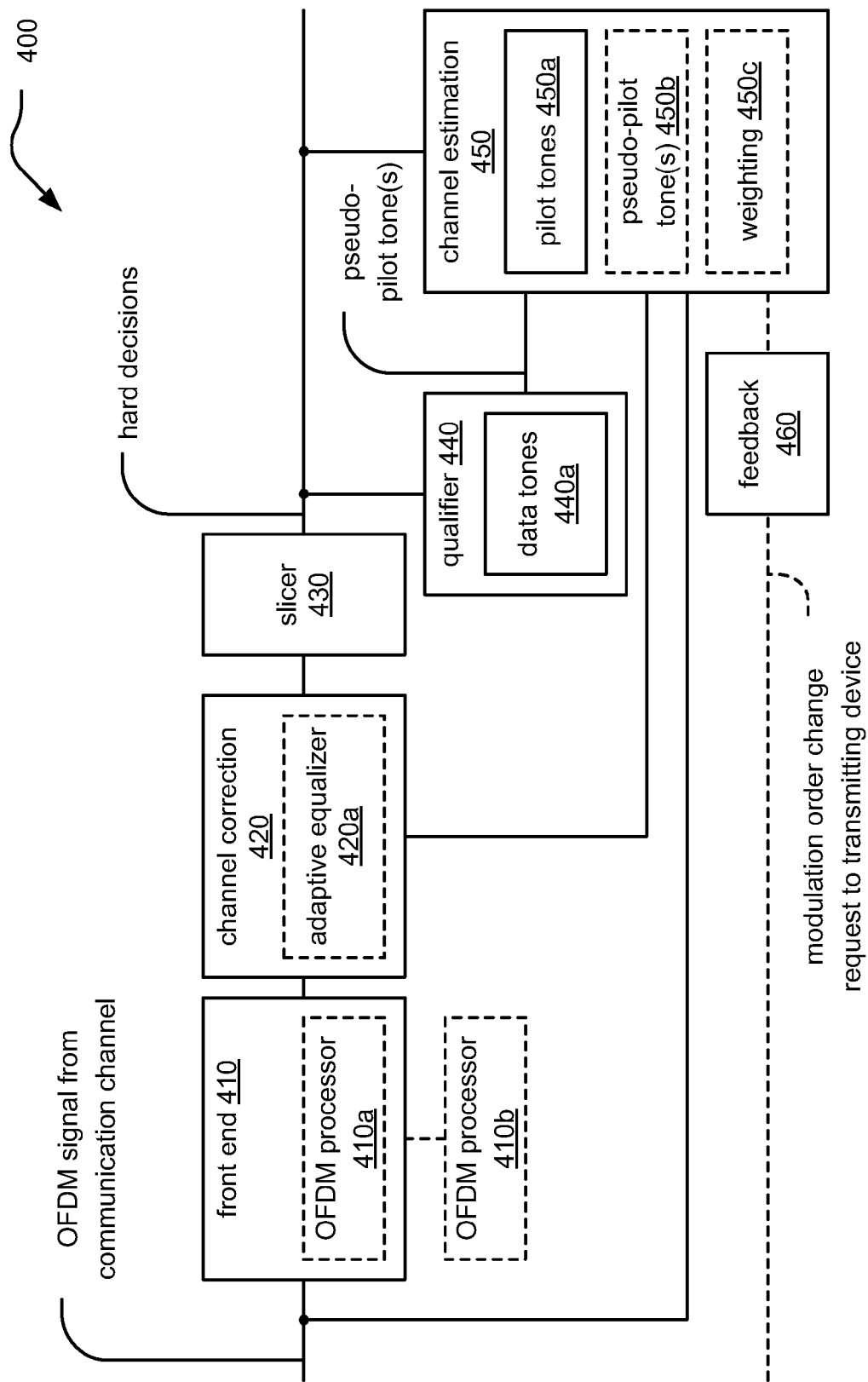
FIG. 4 illustrates an alternative embodiment of an apparatus that processes an OFDM signal to perform channel estimation.

FIG. 4 illustrates an alternative embodiment of an apparatus 400 that processes an OFDM signal to perform channel estimation. An OFDM signal is received from a communication channel and processed initially by a front end module 410. The front end module 410 may include an OFDM processor implemented 410a therein, or the front end module 410 may alternatively be coupled to an OFDM processor 410b. The front end module 410 may perform any necessary pre-processing operations including gain adjustment, filtering, frequency conversion digital sampling, etc. as may be performed within an analog front end (AFE) module.

The front end module 410 processes and identifies any pilot tones and the data tones within the OFDM signal (e.g., by using OFDM processor 410a or 410b). A channel correction module 420 (which may be implemented as an adaptive equalizer 420a such as a decision feedback equalizer (DFE) and/or a feed forward equalizer (FFE)) compensates for any channel effects within the received signal. In some respects, the channel correction module 420 can be viewed as effectuating an inverse channel transfer function with respect to the channel transfer function of the communication channel by which the OFDM signal is received. The channel estimate employed by the channel correction module 420 may be predetermined (e.g., a preliminary channel estimate) or adaptively determined (as by channel estimation module 450). The channel estimation module 450 may employ any of a variety of means to calculate a channel estimate (e.g., using only pilot tones, using pilot tones and one or more pseudo-pilot tones, averaging among multiple channel estimates, etc.).

A slicer module 430 processes any pilot tones and data tones within the OFDM signal, which is output from the channel correction module 420 thereby generating hard decisions and associated error terms. Any hard decision generated by processing a pilot tone or a data tone has an associated error term as well (e.g., for a data tone, the error term being the difference between the actual symbol value and the symbol value associated with a constellation point to which it is mapped; for a pilot tone, the error term being the difference between the actual pilot tone symbol's value and the predetermined symbol value associated with a predetermined constellation point to which the pilot tone is mapped and corresponds).

From the slicer module 430, these pilot tone hard decisions are provided to a channel estimation module 450 (as shown by reference numeral 450a therein). A qualifier module 440 processes one of more data tone hard decisions output from the slicer module 430 (as shown by reference numeral 440a within the qualifier module 440) to identify one or more pseudo-pilot tone hard decisions. This identification of a pseudo-pilot tone hard decision may be made when the error term corresponding to a data tone hard decision is less than a predetermined threshold value (or an adaptively updated/adjusted threshold value in alternative embodiments).

The channel estimate module 450 employs the hard decisions associated with pilot tones 450a and one or more pseudo-pilot tone hard decisions 450b in making a channel estimate of the communication channel from which the OFDM signal is received. Also, when a data tone hard decision qualifies based on a constraint condition being employed for qualification, a sample of the estimated channel frequency response may be derived by taking the complex ratio of the received value of the data tone divided by the data tone hard decision. This sample of the estimated channel frequency response may be processed using an Inverse Fourier Transform (IFT) or Inverse Fast Fourier Transform (IFFT) thereby generating a contribution to the time-domain estimated channel impulse response from the pseudo-pilot tone, thereby allowing it to be employed as if it were a pilot tone.

It is noted that the channel estimate (e.g., of channel frequency response, as made by the channel estimate module 450) is improved by using the qualified symbol decisions to "back out" or compute the slicer error on a data tone, if any, and the complex ratio of the received signal to the hard decision value comprises a channel estimate sampled at the frequency of the data tone. A new and improved channel estimate can be computed with much more data samples, thus reducing any variance that may be attributed to thermal noise. Of course, symbol errors are considered, since they may operate to increase the error in the channel estimate when they do in fact occur in such a decision feedback scheme.

By comparing the raw "channel estimate/frequency response estimate+noise" in adjacent data tones (and nearly adjacent, and so on), and by realizing that the channel estimate generally does not vary greatly for adjacent data tones, symbol errors may be identified immediately, and these potentially erroneous symbols may be excluded (at a minimum) from the channel estimation (frequency response estimation process) thereby improving channel estimates for use compensating for channel effects incurred within a signal transmitted across a communication channel.

As is also described in other embodiments herein, various forms of weighting (e.g., of frames, of tones, etc.) may be employed as well when making the channel estimate (as shown by reference numeral 450c). In certain embodiments, the apparatus 400 may include a feedback module that transmits a modulation order change request, via the communication channel, to a transmitting communication device (e.g., another apparatus) based on at least one of the pilot tone error terms or at least one of the data tone error terms.

For example, when a magnitude of one of the data tone error terms is less than or equal a threshold value (which may be a different threshold value than mentioned above), the modulation order change request indicates to increase a modulation order (e.g., from 16 QAM up to 64 QAM) for subsequently transmitted OFDM signals transmitted from the other communication device to the apparatus 400.

Also, when the magnitude of one of the data tone error terms is greater than the threshold value, the modulation order change request indicates to decrease a modulation order (e.g., from 16 QAM down to QPSK/4 QAM) for subsequently transmitted OFDM signals transmitted from the other communication device to the apparatus 400.

Alternatively, when a magnitude of one of the pilot tone error terms is less than or equal to a corresponding threshold, the modulation order change request indicates to increase a modulation order (e.g., from 64 QAM up to 256 QAM) for subsequently transmitted OFDM signals transmitted from the other communication device to the apparatus 400. Also when the magnitude of one of the pilot tone error terms is greater than the corresponding threshold, the modulation order change request indicates to decrease the modulation order (e.g., from 64 QAM down to 16 QAM) for subsequently transmitted OFDM signals transmitted from the other communication device to the apparatus 400.

Figure 5:
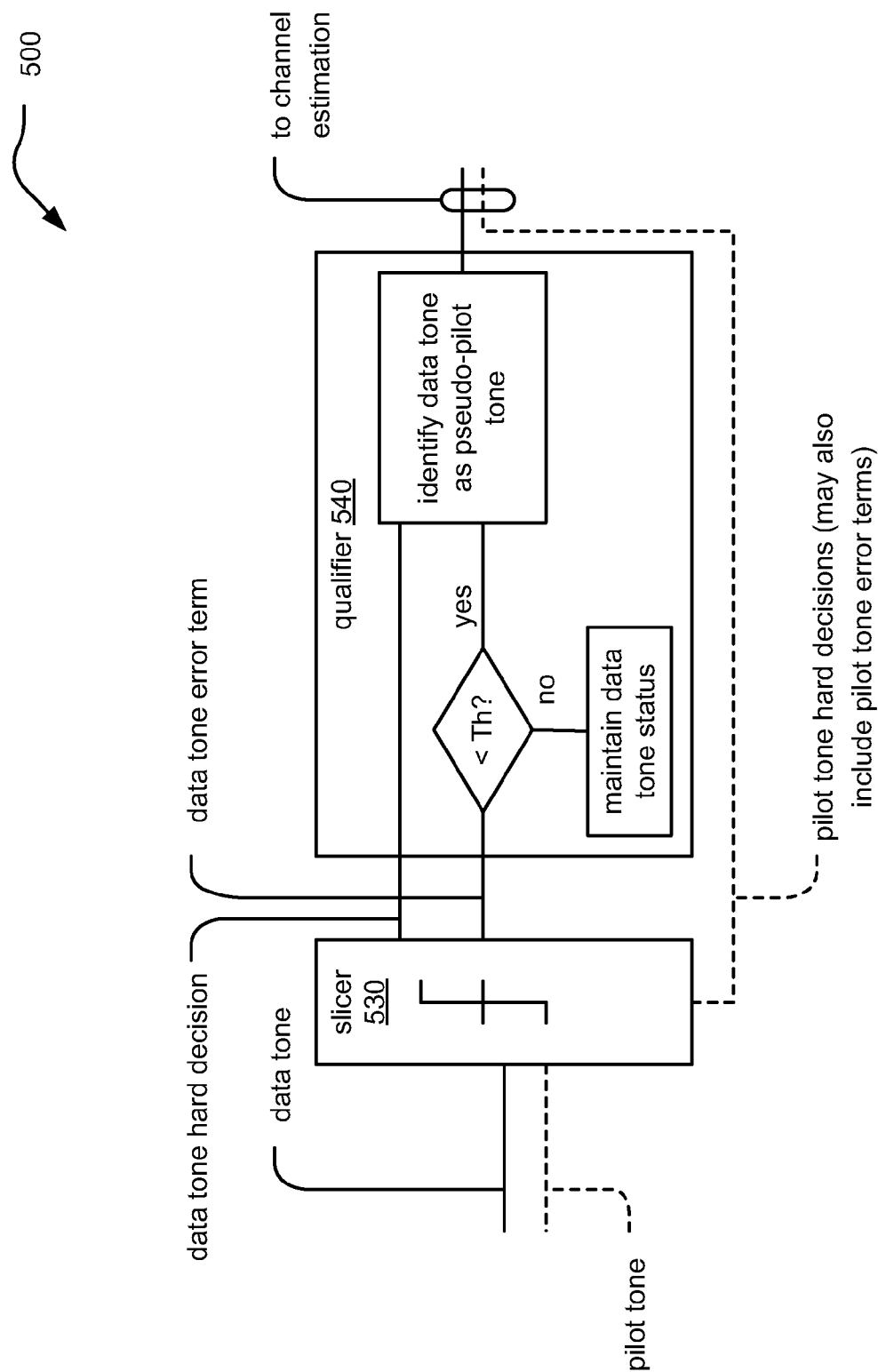
FIG. 5 illustrates an embodiment of an apparatus that includes a slicer and a qualifier to process an OFDM signal to assist with channel estimation.

FIG. 5 illustrates an embodiment of an apparatus 500 that includes a slicer and a qualifier to process an OFDM signal to assist with channel estimation. A data tone is provided to a slicer module 530 to generate a corresponding data tone hard decision and a data tone error term that are employed by a qualifier module 540. It is determined whether the data tone error term is less than a threshold value in the qualifier module 540. If yes, then the corresponding data tone hard decision may be identified as a pseudo-pilot tone and employed subsequently in channel estimation. Alternatively, if the data tone error term does not meet the appropriate selection criterion/criteria (being less than a threshold in this embodiment), then a status of data tone is maintained to be solely data tone. It is also noted that a pilot tone hard decision (and its associated pilot tone error term), as may be generated by the slicer module 530, may also be employed to perform channel estimation.

Figure 6:
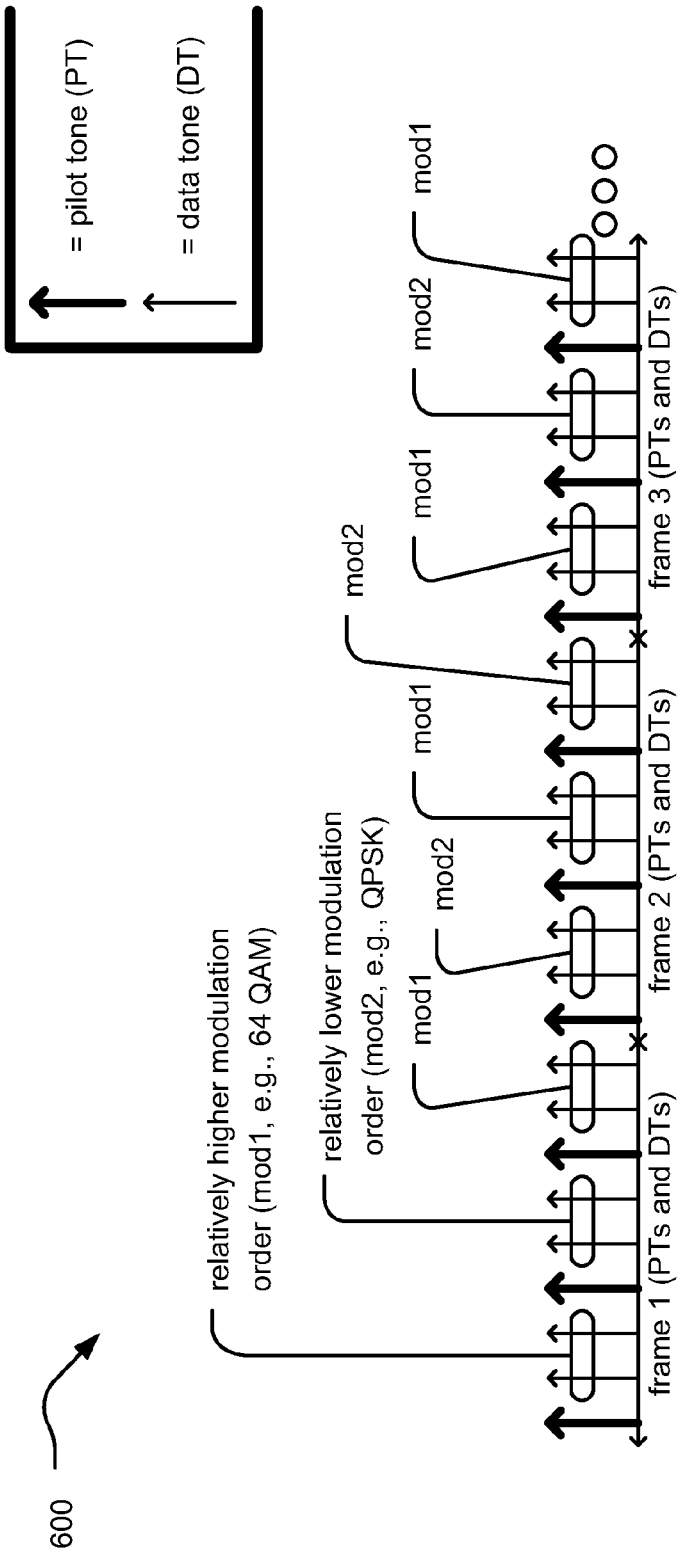
FIG. 6 illustrates an embodiment of pilot tones and data tones within an OFDM signal.

FIG. 6 illustrates an embodiment 600 of pilot tones and data tones within an OFDM signal. This diagram shows multiple frames of an OFDM signal with each frame including pilot tones and data tones therein. Each individual data tone may include a corresponding symbol having a different modulation type than a corresponding symbol of another data tone.

There may some predetermined pattern of changing modulation types for symbols in different tones within the OFDM signal or within various frames of the OFDM signal. In addition, certain adjacent data tones may include symbols having the same modulation type (e.g., mod1 shown as being 64 QAM and mod2, being QPSK, which is a relatively lower modulation order in this diagram).

There may also be predetermined data tone locations within certain frames of the OFDM signal that have predetermined modulation types. For example, with such information (e.g., tone #x has QPSK modulation type in each frame), there may be an even greater confidence associated with a symbol extracted from that data tone to qualify it as a pseudo-pilot tone. Generally, data tones whose corresponding symbols have relatively lower modulation order types (e.g., 16 QAM, QPSK, etc.) may qualify more frequently for use than data tones whose corresponding symbols have relatively higher modulation order types (e.g., 64 QAM, 256 QAM, 1024 QAM, etc.).

Figure 7:
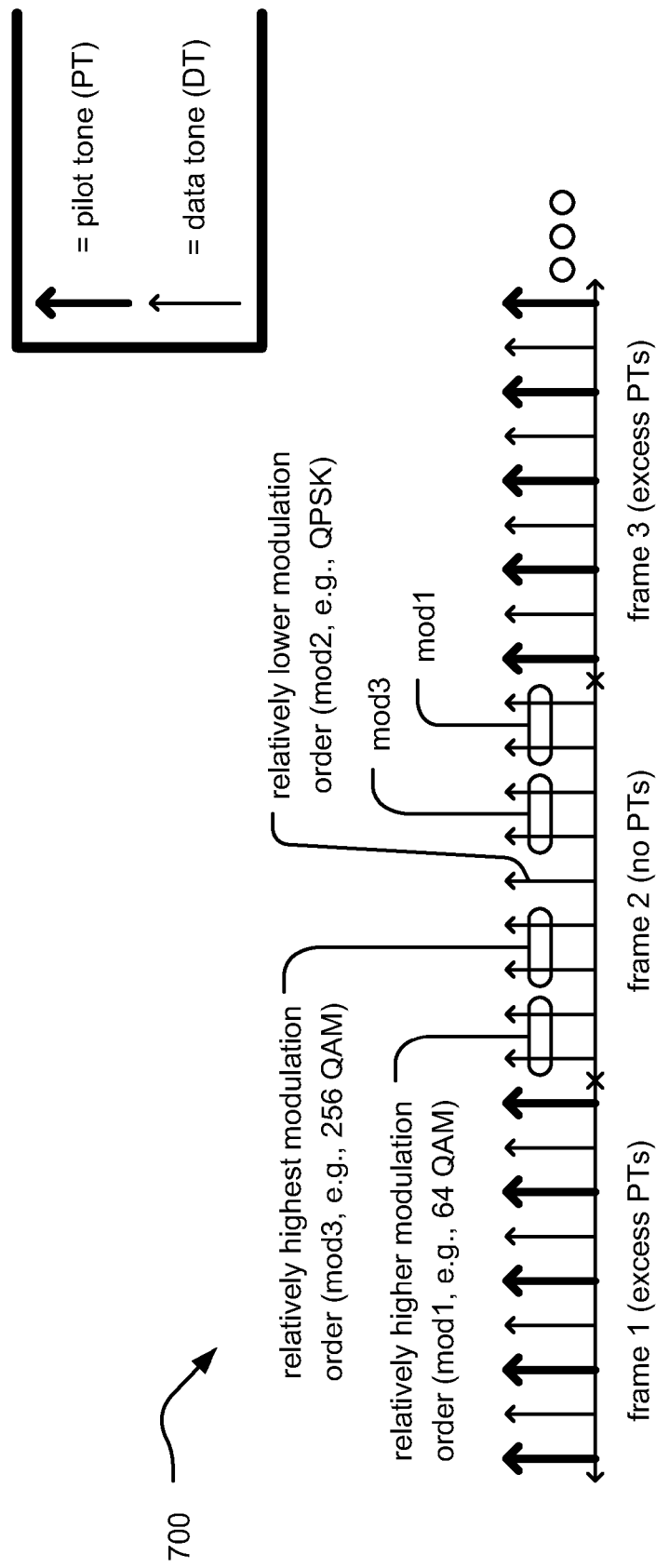
FIG. 7 illustrates an alternative embodiment of pilot tones and data tones within an OFDM signal.

FIG. 7 illustrates an alternative embodiment 700 of pilot tones and data tones within an OFDM signal. This diagram shows multiple frames of an OFDM signal with each frame including data tones therein and only some of the frames include pilot tones therein. It is noted that employing pilot tones within a frame, although perhaps serving useful purposes in accordance with channel estimation, generally reduce the overall throughput capabilities of an OFDM signal. By employing some frames that have no pilot tones therein, then clearly more information may be included within those frames thereby increasing throughput of the signal.

In addition, by including extra pilot tones (e.g., redundant pilot tones and/or excess pilot tones) within a frame can provide for an even better channel estimate for the communication channel (e.g., more pilot tones than are required to make an accurate channel estimate for the communication channel based on its maximum delay spread).

This diagram shows frame 1 and frame 3 as having excess pilot tones therein, yet frame 2 includes no pilot tones therein. As with other embodiments, the symbols carried via the data tones of these frames may have different modulation types. Also, knowledge of this modulation type order/pattern may provide for greater confidence associated with a symbol extracted from a particular data tone to qualify it as a pseudo-pilot tone.

In this embodiment, possibly highly accurate channel estimates may be made for the communication channel using frames 1 and 3. If a difference between these two channel estimates (e.g., for frames 1 and 3) is within an acceptable tolerance, then perhaps one of those channel estimates (or an average channel estimate calculated from those two channel estimates) may be employed to process frame 2.

Also, symbols within frame 2 having relatively lower modulation order may be associated as having a relatively higher confidence level to associate data tone hard decisions generated there from as pseudo-tone pilot decisions for use in channel estimation.

When a channel estimate compensation has been applied to the data tones and/or pilot tones, a channel estimate which is then produced from such compensated tones may be considered a residual channel estimate. Residual channel estimates may be combined with the channel correction to produce the total channel estimate, and/or may be combined with previous and even future residual channel estimates or total channel estimates (from previous and future frames) to enhance the accuracy of a residual channel estimate and/or an overall channel estimate. In one embodiment, some or all data tone symbols within frame 2 are tested for qualification by considering the modulation order of each in conjunction with testing data tone error terms against thresholds and/or comparing the change among samples of the estimated channel frequency response at adjacent and near-adjacent frequencies (corresponding to adjacent and near-adjacent data tones) against a channel variation-versus-frequency threshold. Some or all of the qualified data tones (the pseudo-pilot tones) may be used for contributing to the estimation of the channel during this frame, and possibly contributing to the estimation of the channel during other frames.

Figure 15:
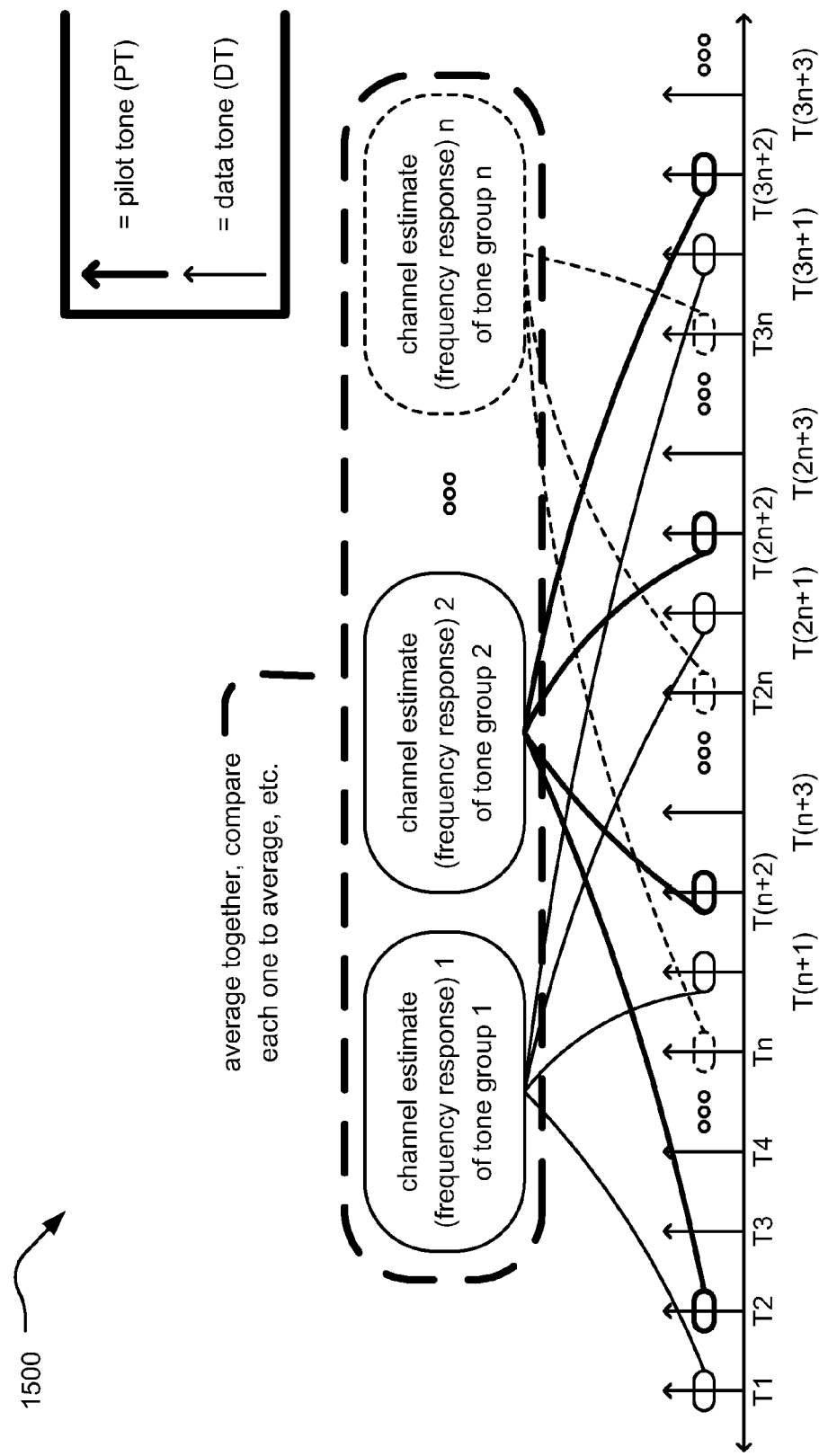
FIG. 15 illustrates an embodiment of selectively grouping data tones and/or pilot tones when performing channel estimation.

In yet another embodiment, of a frame which may or may not include pilot tones, one set or a number of sets of qualified data tones and pilot tones which are equally spaced in frequency and span across the channel are identified and each such set may be used to generate a channel estimate (e.g., see FIG. 15 for one possible implementation). The channel estimates from these various sets may be combined (e.g., an average or a weighted average, with the weighting among the plurality of channel estimates depending on the qualification parameters of the qualified data tones and/or pilot tones with the sets).

In even another embodiment, one set or a number of sets of equally spaced pilot tones (and/or pseudo-pilot tones) may be nearly available, but one or more of the sets may be missing one or more of the tones, due to the tone at the particular spacing interval (in the frequency domain) being not qualified. In such an instance a sample of the estimated channel response corresponding to the missing pilot tones or pseudo-pilot tones may be interpolated from adjacent or nearly adjacent pilot tones or pseudo-pilot tones, with such interpolation possibly based in the frequency domain (e.g., see FIG. 14 for one possible implementation). As long as pilot tones and qualified data tones satisfy Nyquist spacing criteria based on the upper bound of the time domain duration of the impulse response, even more complex techniques for interpolating the channel estimate using unevenly spaced samples may be applied, including least squares matching techniques, in the event of missing samples within one or a plurality of the sets.

Figure 8:
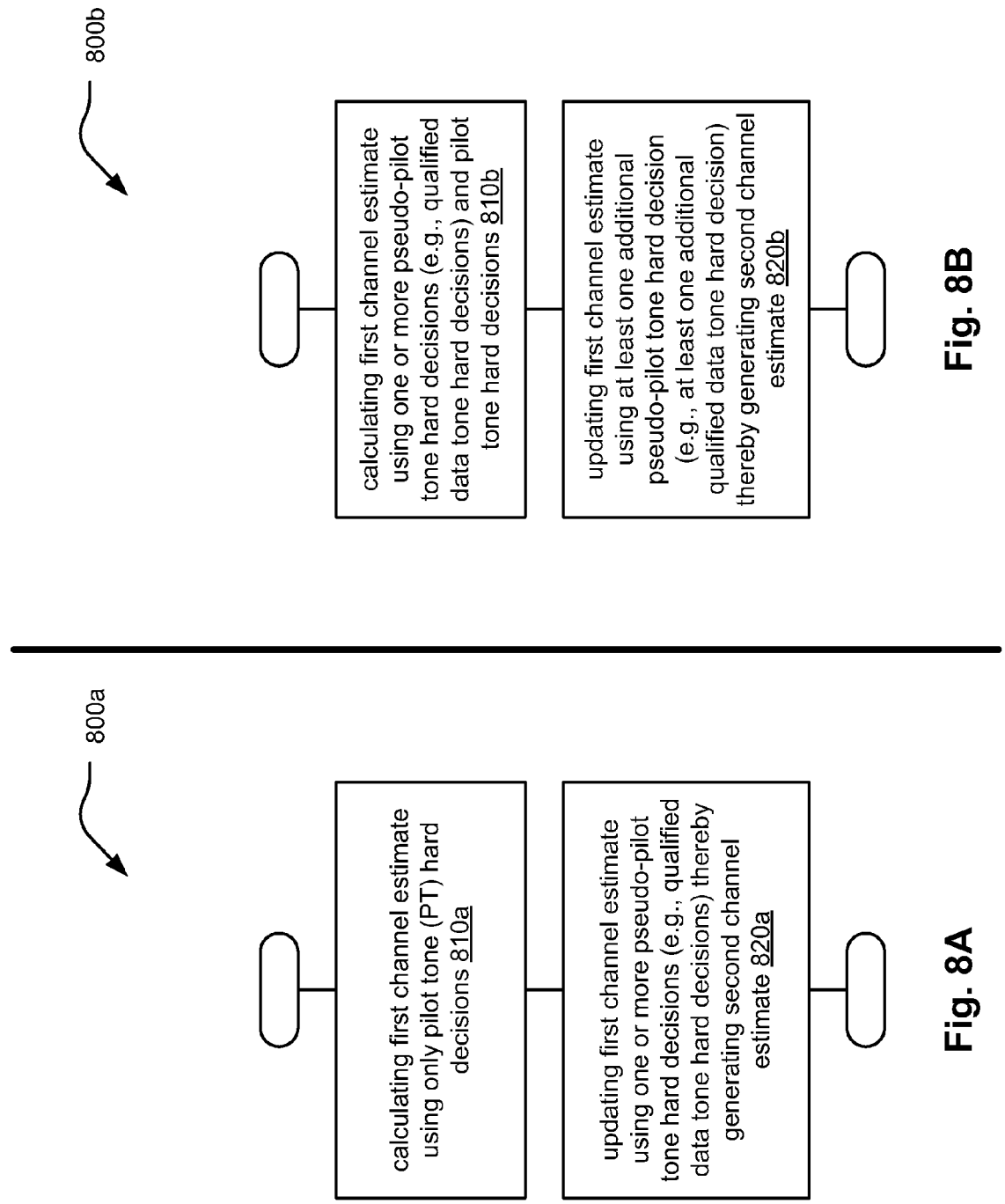
FIG. 8A illustrates an embodiment of a method for performing channel estimation.
FIG. 8B illustrates an alternative embodiment of a method for performing channel estimation.

FIG. 8A illustrates an embodiment of a method 800*a* for performing channel estimation. The method 800*a* begins by calculating a first channel estimate using only pilot tone hard decisions, as shown in a block 810*a*. The method 800*a* continues by updating the first channel estimate using one or more pseudo-pilot tone hard decisions (e.g., qualified data tone hard decisions), thereby generating a second channel estimate, as shown in a block 820a.

In this diagram, it can be seen that the use of one or more pseudo-pilot tone hard decisions (e.g., qualified data tone hard decisions) may be employed to increase the fidelity and/or accuracy of a channel estimate.

FIG. 8B illustrates an alternative embodiment of a method 800b for performing channel estimation. The method 800b begins by calculating a first channel estimate using one or more pseudo-pilot tone hard decisions (e.g., qualified data tone hard decisions) and pilot tone hard decisions, as shown in a block 810b. The method 800b continues by updating the first channel estimate using at least one additional pseudo-pilot tone hard decision (e.g., at least one additional qualified data tone hard decisions), thereby generating a second channel estimate, as shown in a block 820b.

In this diagram, it can be seen that while one or more pseudo-pilot tone hard decisions (e.g., qualified data tone hard decisions) are employed when calculating the first channel estimate, the use of one or more additional pseudo-pilot tone hard decisions (e.g., one or more additional qualified data tone hard decisions) may be employed to increase the fidelity and/or accuracy of a channel estimate.

Figure 9:
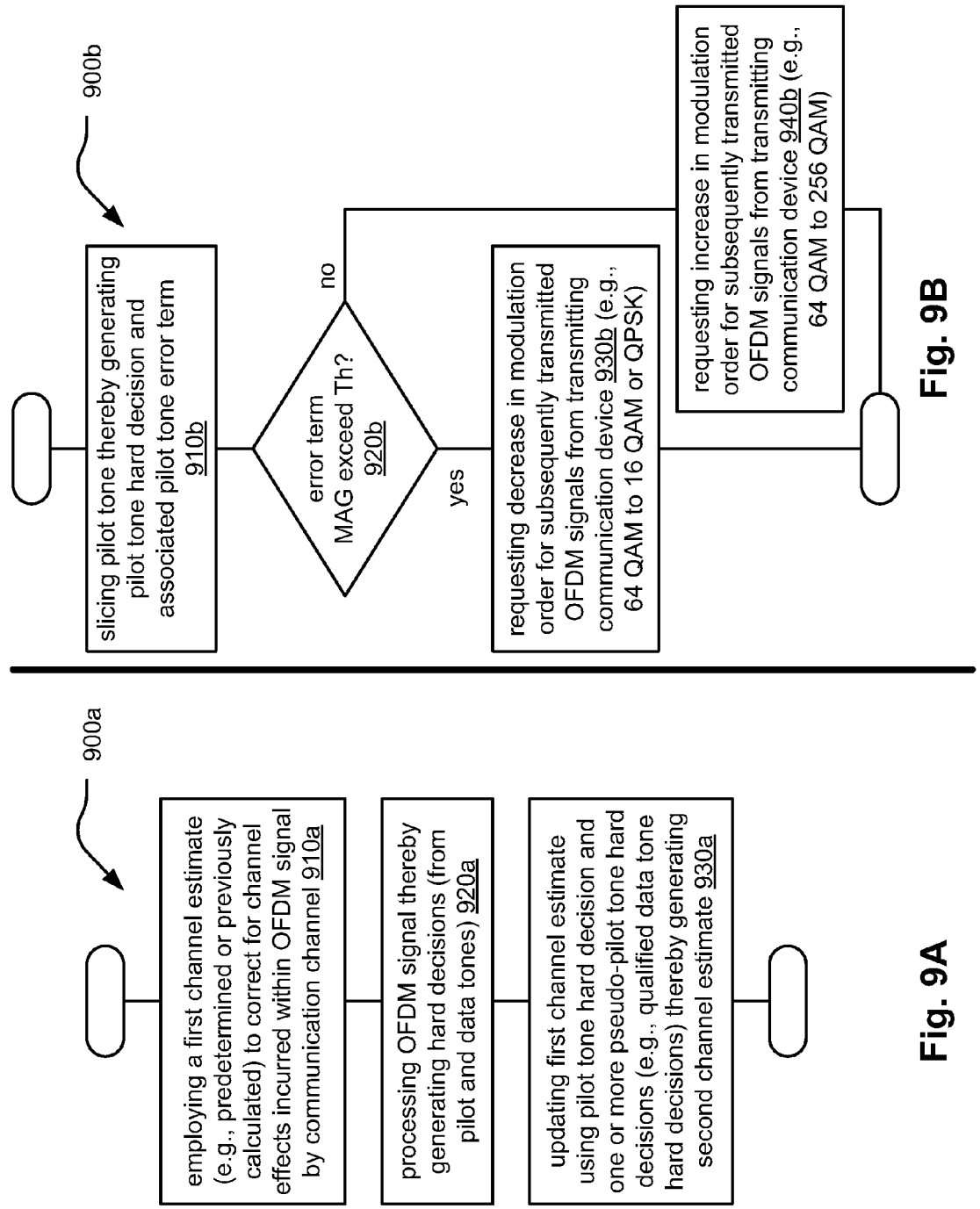
FIG. 9A illustrates an embodiment of a method for employing and updating a channel estimate.
FIG. 9B illustrates an alternative embodiment of a method for effectuating a modulation order change.

FIG. 9A illustrates an embodiment of a method 900a for employing and updating a channel estimate. The method 900a begins by employing a first channel estimate (e.g., a predetermined or previously calculated) to correct for channel effects incurred within an OFDM signal by a communication channel, as shown in a block 910a.

The method 900a continues by processing the OFDM signal thereby generating hard decisions there from (e.g., from the pilot tones and data tones therein), as shown in a block 920a. The method 900a continues by updating the first channel estimate using pilot tone hard decisions and one or more pseudo-pilot tone hard decisions (e.g., qualified data tone hard decisions) thereby generating a second channel estimate, as shown in a block 930a.

FIG. 9B illustrates an alternative embodiment of a method 900b for effectuating a modulation order change. The method 900b begins by slicing a pilot tone thereby generating a pilot tone hard decision and an associated pilot tone error term (e.g., difference between predetermined/expected value for symbols of that pilot tone and what is actually detected), as shown in a block 910b.

If a magnitude of the associated error term exceeds some threshold value, as determined in a block 920b, then the method 900b operates by requesting a decrease in a modulation order for subsequently transmitted OFDM signals from a transmitting communication device, as shown in a block 930b. In one embodiment, this may involve decreasing the modulation order from 64 QAM to 16 QAM or QPSK. Alternatively, if a magnitude of the associated error term does not exceed the threshold value, as determined in a block 920b, then the method 900b operates by requesting an increase in a modulation order for subsequently transmitted OFDM signals from a transmitting communication device, as shown in a block 940b. In one embodiment, this may involve increasing the modulation order from 64 QAM to 256 QAM.

Figure 10:
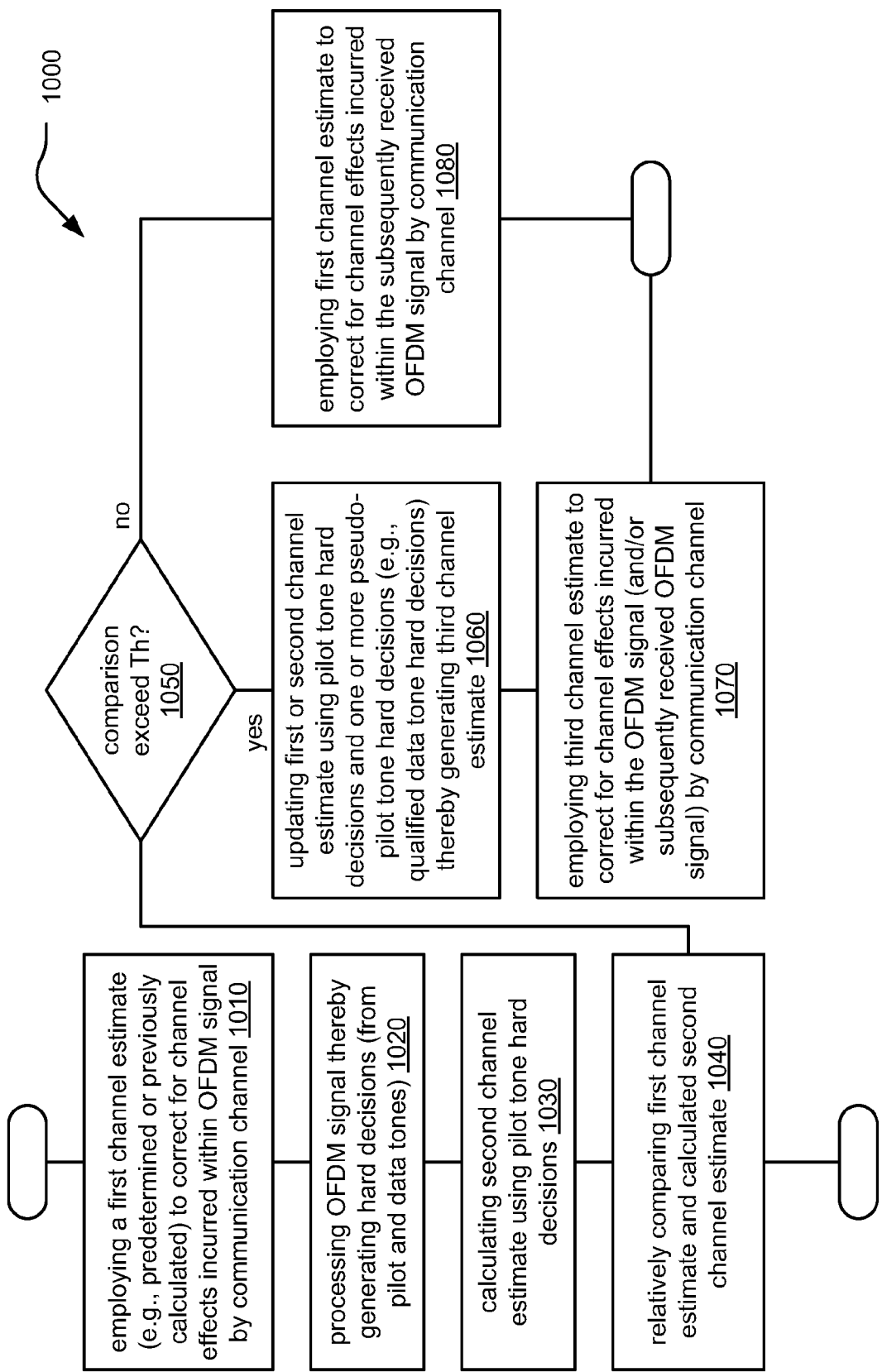
FIG. 10 illustrates an embodiment of a method for employing various channel estimates to process a signal.

FIG. 10 illustrates an embodiment of a method 1000 for employing various channel estimates to process a signal. The method 1000 begins by employing a first channel estimate (e.g., a predetermined or previously calculated) to correct for channel effects incurred within an OFDM signal by a communication channel, as shown in a block 1010. The method 1000 continues by processing the OFDM signal thereby generating hard decisions from the pilot tones and data tones therein, as shown in a block 1020.

The method 1000 continues by calculating a second channel estimate using the pilot tone hard decisions, as shown in a block 1030. The method 1000 then operates by relatively comparing the first channel estimate and the calculated second channel estimate, as shown in a block 1040. In a block 1050, it is determined whether or not the comparison exceeds some threshold value. If it does not, then the method 1000 then continues to operate by employing the first channel estimate to correct for channel effects incurred within a subsequently received OFDM signal by the communication channel, as shown in a block 1080.

Alternatively, when the comparison does exceed some threshold value, then the method 1000 continues by updating the first or the second channel estimate using pilot tone hard decisions and one or more pseudo-tone hard decisions (e.g., qualified data tone hard decisions) thereby generating a third channel estimate, as shown in a block 1060. The method 1000 then continues to operate by employing the third channel estimate to correct for channel effects incurred within the OFDM signal (and/or a subsequent OFDM signal) received by the communication channel, as shown in a block 1070.

It is noted here that the currently updated or currently calculated channel estimate may be employed to go back and re-process any OFDM signal (or OFDM frame or other signal portion therein) to re-generate hard decisions there from. For example, a first channel estimate may be employed to correct for channel effects within an OFDM signal and from which first hard decisions are made, and then once the first channel estimate is updated to generate a second channel estimate, that second channel estimate may be employed to re-process that very same OFDM signal to make second hard decisions there from.

Figure 11:
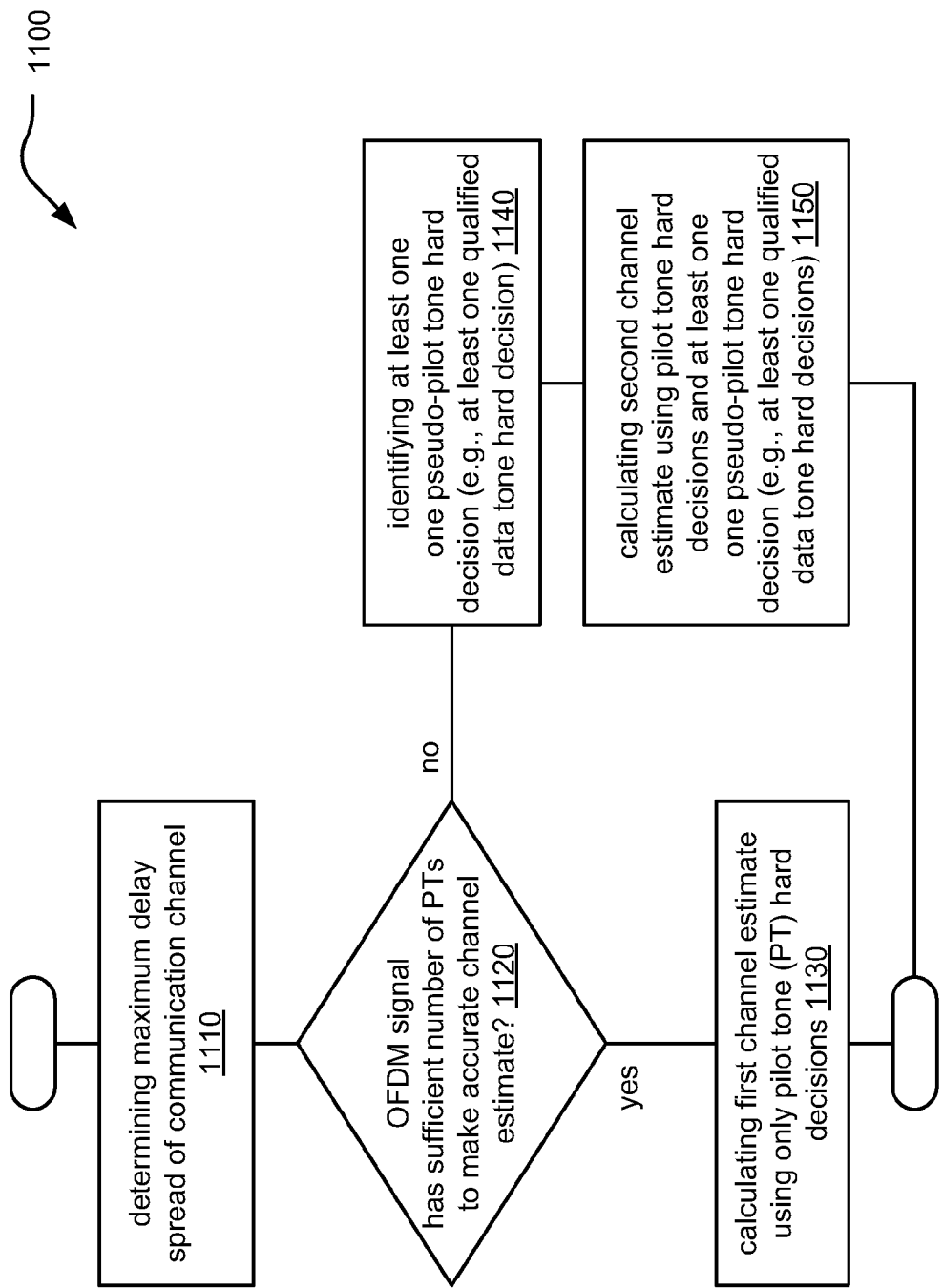
FIG. 11 illustrates an embodiment of a method for employing various channel estimates to process a signal.

FIG. 11 illustrates an embodiment of a method 1100 for employing various channel estimates to process a signal. The method 1100 begins by determining a maximum delay spread of a communication channel, as shown in a block 1110. This information may be employed to determine a minimal number of pilot tones that are adequate to perform an accurate channel estimate for the communication channel from which a signal is received.

Then, as shown in a block 1120, it is determined whether or not the OFDM signal that is received does indeed include a sufficient number of pilot tones to make an accurate channel estimate (e.g., based on the determined maximum delay spread of the communication channel). If there are a sufficient number of pilot tones therein, then the method 1100 operates by calculating a first channel estimate using only those pilot tone hard decisions (and/or associated error terms) within the OFDM signal, as shown in a block 1130.

Alternatively, it there are an insufficient number of pilot tones therein, then the method 1100 operates by identifying at least one pseudo-pilot tone hard decision (e.g., at least one qualified data tone hard decision), as shown in a block 1140. The method 1100 then operates by calculating a second channel estimate using the pilot tone hard decisions (and/or associated error terms) and the identified at least one pseudo-pilot tone hard decision (e.g., at least one qualified data tone hard decision), as shown in a block 1150.

Figure 12:
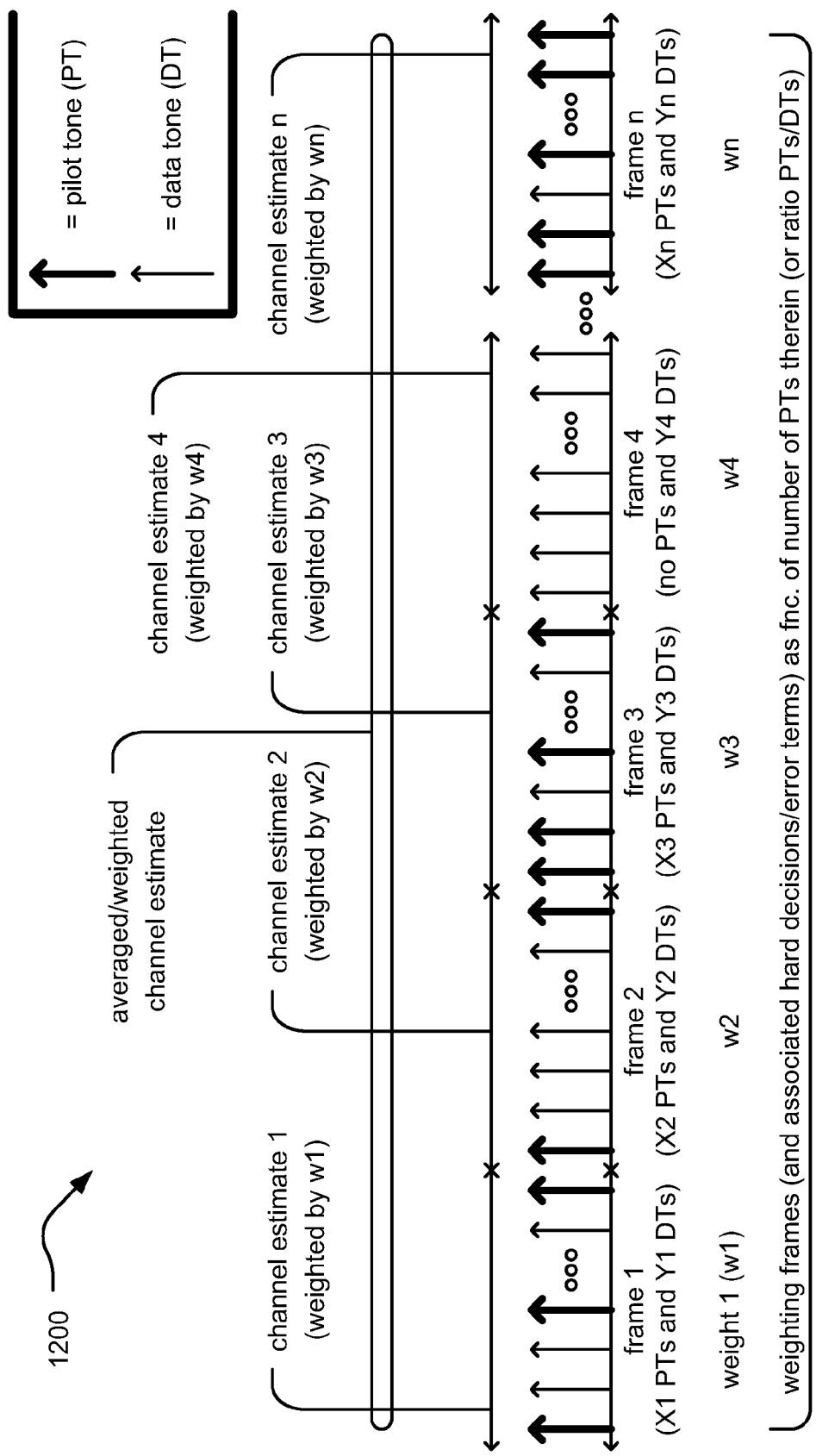
FIG. 12 illustrates an embodiment of weighting of frames, based on pilot tones included therein, when performing channel estimation.

FIG. 12 illustrates an embodiment 1200 of weighting of frames, based on pilot tones included therein, when performing channel estimation. This diagram shows how each frame (and the hard decisions made there from) is weighted as a function of the number of pilot tones therein for use in calculating a channel estimate for a communication channel. Alternatively, the ratio of pilot tones to data tones within a particular frame may be used to determine the particular weight to be attributed for the channel estimate of that particular frame.

If desired, an average channel estimate may be computed using multiple channel estimates from any two or more frames. This diagram shows an averaged/weighted channel estimate being calculated using the corresponding channel estimates from each of frames 1 through n; however, it is noted that any two channel estimates corresponding to any two frames may be employed to calculate an averaged/weighted channel estimate for those two frames. Analogously, it is noted that any n channel estimates corresponding to any n frames may be employed to calculate an averaged/weighted channel estimate for those n frames.

Figure 13:
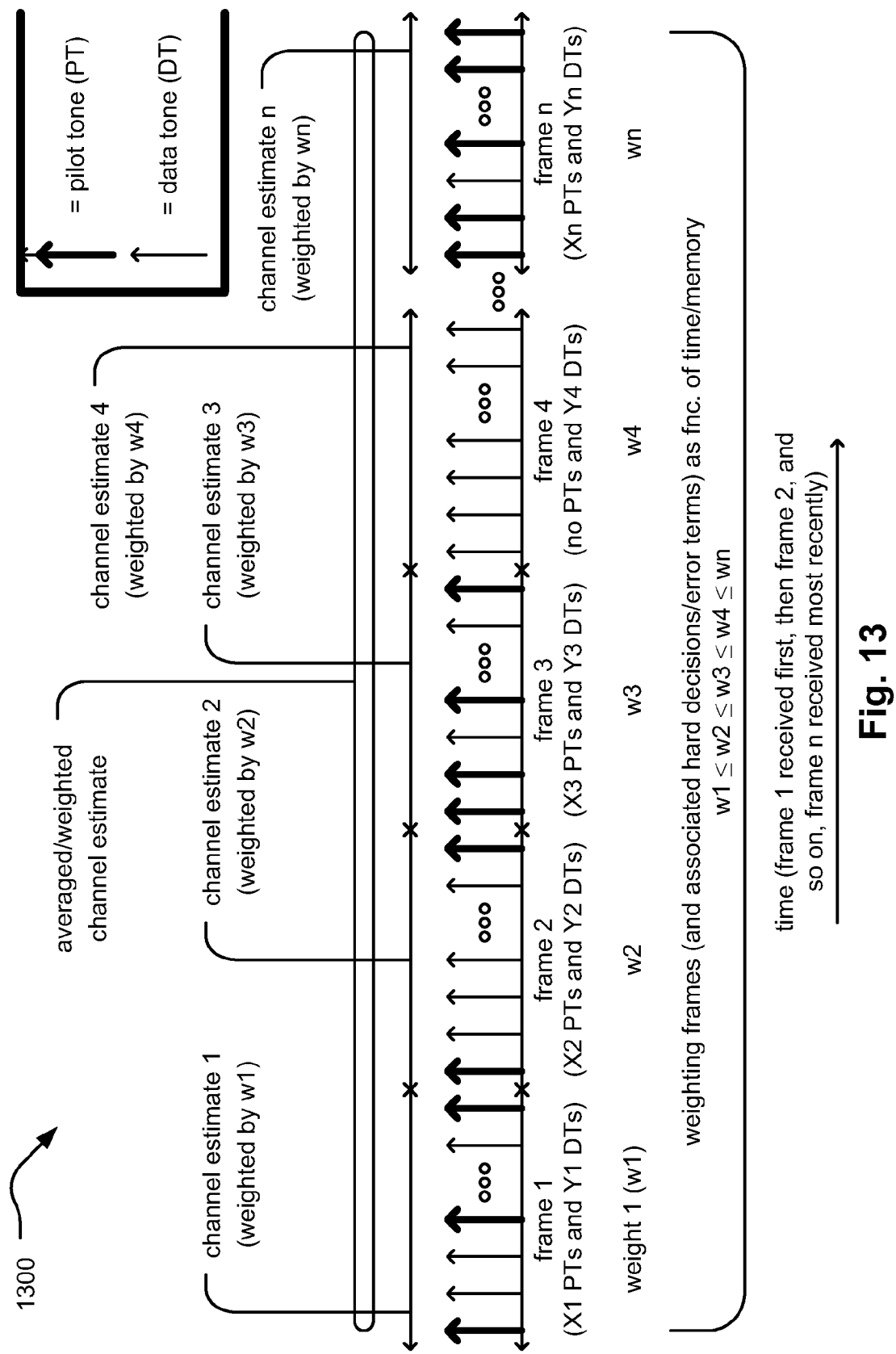
FIG. 13 illustrates an embodiment of weighting of frames, based on time/memory, when performing channel estimation.

FIG. 13 illustrates an embodiment 1300 of weighting of frames, based on time/memory, when performing channel estimation. This diagram shows how each frame (and the hard decisions made there from) is weighted as a function of the time/memory. For example, this diagram shows that frame 1 is received first, then frame 2, and so on up to frame n. The weighting of channel estimates associated with each frame is based in one embodiment on how recently it is received in the part. For example, the channel estimate associated with the most recently received frame (e.g., frame n) has the largest weight. The weights applied to the channel estimates associated with each of the other previously received frames are less than or equal to the weight applied to the channel estimates associated with the current (i.e., most recently received) frame.

In another embodiment, a frame may be excluded from the computation of channel estimates and composite gain estimates if it has an associated error power which is above a threshold, which threshold may be related to (or derived from or adjusted by) error power of other frames, or set absolutely, or set depending on other characteristics of the actual or desired communications (e.g., adaptively determined based on various parameters). In yet another embodiment, a frame may be weighted by a combination of both its quality (e.g., as measured by error power) and how recently it was received. This may be viewed as being a two-dimensional weighting, in that, both time (e.g., received) and a quality parameter are both employed in the weighting.

As with other embodiments herein, if desired with respect to this diagram, an average channel estimate may be computed using multiple channel estimates from any two or more frames. This diagram shows an averaged/weighted channel estimate being calculated using the corresponding channel estimates from each of frames 1 through n; however, it is noted that any two channel estimates corresponding to any two frames may be employed to calculate an averaged/weighted channel estimate for those two frames. Analogously, it is noted that any n channel estimates corresponding to any n frames may be employed to calculate an averaged/weighted channel estimate for those n frames.

In yet another embodiment, by tracking the residual channel estimate (e.g., from frame to frame on a per frame basis), a relatively small difference between successive residual channel estimates compared to the residual channel estimates themselves (e.g., their average) could be indicative of an abrupt channel change before the previous frame. This processing approach could also be extrapolated to include more frames and even more complicated metrics.

Figure 14:
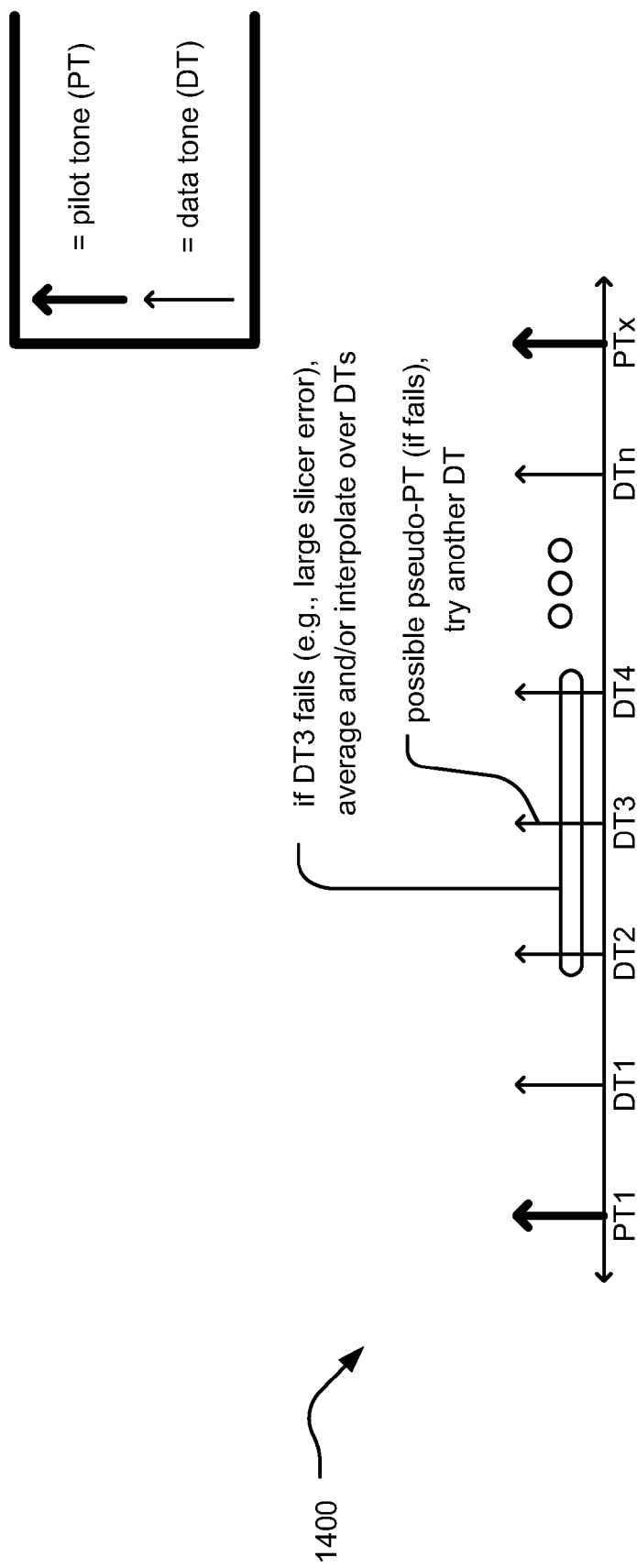
FIG. 14 illustrates an embodiment of selectively employing data tones when performing channel estimation.

FIG. 14 illustrates an embodiment 1400 of selectively employing data tones when performing channel estimation. This diagram shows how hard decisions associated with adjacent and/or nearby data tones within an OFDM signal may be analyzed and employed for use in performing channel estimation. It may be noted that tones that are relatively closed located to one another in the frequency domain may be viewed as having associated channel estimates that are relatively close to one another in value. For example, considering this diagram and if it is assumed that the hard decision associated with data tone 3 (DT3) fails because it perhaps has a relatively large slicer error, then it may be estimated that the channel estimate associated with that hard decision is incorrect. The channel estimates associated with and employed with each of data tone 2 (DT2) and data tone 4 (DT4) may be averaged together and/or interpolated to calculate a more accurate channel estimate for use in processing DT3.

In addition, if the slicer error associated with DT3 is too large (based on some constraint, such as a threshold), then any hard decision associated with that DT3 may need to be erased. In general, the assumption that the channel estimate associated with relatively closely spaced tones (in the frequency domain) is not significantly different allows intelligent decision making of the channel estimates associated therewith. When certain slicer errors are significantly in error, then intelligently analyzing channel estimates and slicer errors of nearby and/or adjacent tones can allow for correction/compensation of the erroneous slicer errors and/or erroneous channel estimates.

FIG. 15 illustrates an embodiment 1500 of selectively grouping data tones and/or pilot tones when performing channel estimation. This diagram operates based on creating a channel estimate from a set of qualified samples of the estimated channel response which are equally spaced in the frequency domain across the channel, and for creating a channel estimate for each of a plurality of such sets where a plurality of such sets may exist in a frame.

A first plurality of tones (e.g., pilot tones and/or data tones in tone group 1) are employed to make a channel estimate (frequency response) 1, a second plurality of tones (e.g., pilot tones and/or data tones in tone group 2) are employed to make a channel estimate (frequency response) 2, and so on until an n-th plurality of tones (e.g., pilot tones and/or data tones in tone group n) are employed to make a channel estimate (frequency response) n.

In this embodiment, tone group 1 (which may include pilot tones and/or data tones) includes tones numbered 1, n+1, 2n+1, etc., tone group 2 (which may include pilot tones and/or data tones) includes tones numbered 2, n+2, 2n+2, etc., and so one up to tone group n (which may include pilot tones and/or data tones) includes tones numbered n, 2n, 3n, etc.

For one specific example, considering a portion of a signal (e.g., a frame) including 64 tones, 8 separate tone groups could be used to make 8 separate channel estimates (i.e., tones 1, 9, 17, and so on up to 57 would form tone group 1; tones 2, 10, 18, and so on up to 58 would form tone group 2; . . . ; and tones 8, 16, 24, and up to 64 would form tone group 8).

This provides a number of redundant channel estimates. As with other embodiments described herein, two or more channel estimates may be processed together (e.g., averaged together, weighted and averaged together, etc.) to generate an average channel estimate. In addition, the various channel estimates may be compared to one another, and if one channel estimate appears to be an outlier (e.g., largely different from the majority of other channel estimates), then it may be discarded and/or the hard decisions made using that channel estimate may need to be re-calculated, erased, etc.

It is noted that the various modules (e.g., encoding modules, decoding modules, channel correction modules, channel correction modules, slicer modules, qualifier modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus comprising:
an input configured to receive an orthogonal frequency division multiplexing (OFDM) signal that includes a plurality of data tones and a plurality of pilot tones from a communication channel;
a slicer configured to generate a plurality of data tone hard decisions and a plurality of data tone error terms based on the plurality of data tones and to generate a plurality of pilot tone hard decisions and a plurality of pilot tone error terms based on the plurality of pilot tones; and
a channel estimator configured to generate a channel estimate of the communication channel based on the plurality of pilot tone hard decisions, at least one of the plurality of pilot tone error terms, and at least one of the plurality of data tone error terms; and wherein:
based on a channel estimate of the communication channel, the slicer is configured to generate at least one additional plurality of data tone hard decisions based on the plurality of data tones.

2. The apparatus of claim 1, wherein the at least one additional plurality of data tone hard decisions is a second plurality of data tone hard decisions; and further comprising:
based on at least one additional channel estimate of the communication channel, the slicer configured to generate a third plurality of data tone hard decisions based on the plurality of data tones.

3. The apparatus of claim 1 further comprising:
a cable modem that is operative in a cable system.

4. The apparatus of claim 1 further comprising:
a feedback module configured to transmit a modulation order change request, via the communication channel, to at least one additional apparatus based on at least one of the plurality of pilot tone error terms or at least one of the plurality of data tone error terms, wherein the OFDM signal is received by the apparatus from the at least one additional apparatus via the communication channel.

5. The apparatus of claim 1 further comprising:
a communication device operative within at least one of a wireless communication system, a wired communication system, and a fiber-optic communication system.

6. An apparatus comprising:
an input configured to receive an orthogonal frequency division multiplexing (OFDM) signal that includes a plurality of data tones and a plurality of pilot tones from a communication channel;
a slicer configured to generate a plurality of data tone hard decisions based on the plurality of data tones and to generate a plurality of pilot tone hard decisions and a plurality of pilot tone error terms based on the plurality of pilot tones;
a channel estimator configured to generate the channel estimate of the communication channel based on the plurality of pilot tone hard decisions and at least one of the plurality of pilot tone error terms; and
based on a channel estimate of the communication channel, the slicer is configured to generate at least one additional plurality of data tone hard decisions based on the plurality of data tones.

7. The apparatus of claim 6, further comprising:
a cable modem that is operative in a cable system.

8. The apparatus of claim 6, further comprising:
a cable modem termination system (CMTS) that is implemented within a cable system.

9. The apparatus of claim 6, further comprising:
the slicer configured to process the plurality of data tones to generate the plurality of data tone hard decisions; and
based on the channel estimate of the communication channel, the slicer configured to re-process the plurality of data tones to generate the at least one additional plurality of data tone hard decisions.

10. The apparatus of claim 6, wherein:
the at least one additional plurality of data tone hard decisions is a second plurality of data tone hard decisions;

the channel estimate of the communication channel is a first channel estimate of the communication channel; and further comprising:
a channel estimator configured to generate the first channel estimate of the communication channel based on only the plurality of pilot tone hard decisions; and
the channel estimator configured to generate a second channel estimate of the communication channel based on the plurality of pilot tone hard decisions and at least one of the plurality of pilot tone error terms; and
based on the second channel estimate of the communication channel, the slicer configured to generate a third plurality of data tone hard decisions based on the plurality of data tones.

11. The apparatus of claim 6, further comprising:
a feedback module configured to transmit a modulation order change request, via the communication channel, to at least one additional apparatus based on at least one of the plurality of pilot tone error terms or at least one of the plurality of data tone error terms, wherein the OFDM signal is received by the apparatus from the at least one additional apparatus via the communication channel.

12. The apparatus of claim 6, further comprising:
the slicer configured to generate a plurality of data tone error terms based on the plurality of data tones; and
the channel estimator configured to generate the channel estimate of the communication channel based on the plurality of pilot tone hard decisions, the at least one of the plurality of pilot tone error terms, and at least one of the plurality of data tone error terms.

13. The apparatus of claim 6 further comprising:
a communication device operative within at least one of a wireless communication system, a wired communication system, a fiber-optic communication system, and a cable system.

14. A method for execution by a communication device, the method comprising:
via an input of the communication device, receiving an orthogonal frequency division multiplexing (OFDM) signal that includes a plurality of data tones and a plurality of pilot tones from a communication channel;
generating a plurality of data tone hard decisions based on the plurality of data tones;
generating a plurality of pilot tone hard decisions and a plurality of pilot tone error terms based on the plurality of pilot tones;
generating the channel estimate of the communication channel based on the plurality of pilot tone hard decisions and at least one of the plurality of pilot tone error terms; and
based on a channel estimate of the communication channel, generating at least one additional plurality of data tone hard decisions based on the plurality of data tones.

15. The method of claim 14, wherein the communication device is a cable modem that is operative in a cable system.

16. The method of claim 14, wherein the communication device is a cable modem termination system (CMTS) that is implemented within a cable system.

17. The method of claim 14, wherein:
the at least one additional plurality of data tone hard decisions is a second plurality of data tone hard decisions;
the channel estimate of the communication channel is a first channel estimate of the communication channel; and further comprising:
generating a plurality of pilot tone hard decisions and a plurality of pilot tone error terms based on the plurality of pilot tones;
generating the first channel estimate of the communication channel based on only the plurality of pilot tone hard decisions;
generating a second channel estimate of the communication channel based on the plurality of pilot tone hard decisions and at least one of the plurality of pilot tone error terms; and
based on the second channel estimate of the communication channel, generating a third plurality of data tone hard decisions based on the plurality of data tones.

18. The method of claim 14 further comprising:
transmitting a modulation order change request, via the communication channel, to at least one additional communication device based on at least one of the plurality of pilot tone error terms or at least one of the plurality of data tone error terms, wherein the OFDM signal is received by the communication device from the at least one additional communication device via the communication channel.

19. The method of claim 14 further comprising:
generating a plurality of data tone error terms based on the plurality of data tones; and
generating the channel estimate of the communication channel based on the plurality of pilot tone hard decisions, the at least one of the plurality of pilot tone error terms, and at least one of the plurality of data tone error terms.

20. The method of claim 14, wherein the communication device is operative within at least one of a wireless communication system, a wired communication system, and a fiber-optic communication system.

\* \* \* \* \*